United States Patent [19]

Edwards et al.

[11] 3,923,721

[45] Dec. 2, 1975

[54] RESIN COMPOSITIONS

[75] Inventors: Alfred Gerald Edwards, Stourport-on-Severn; Glyn Islwyn Harris, Hagley, both of England

[73] Assignee: Albright & Wilson Limited, Oldbury, England

[22] Filed: Jan. 9, 1974

[21] Appl. No.: 431,828

[30] Foreign Application Priority Data
Jan. 16, 1973  United Kingdom............. 2311/73
Aug. 14, 1973  United Kingdom............. 38415/73

[52] U.S. Cl.......... 260/32.8 R; 260/33.4 R; 260/38; 260/52; 260/834; 260/840
[51] Int. Cl.²..  C08K 3/34; C08K 3/36; C08L 61/14
[58] Field of Search .. 260/38, 840, 834, 52, 32.8 R, 260/33.4 R

[56] References Cited
UNITED STATES PATENTS

| | | | |
|---|---|---|---|
| 3,369,056 | 2/1968 | Schwarzer............... | 260/840 X |
| 3,472,915 | 10/1969 | Rider....................... | 260/840 X |
| 3,535,199 | 10/1970 | Kuhr et al................ | 260/840 X |
| 3,576,788 | 4/1971 | Harris et al.............. | 260/38 X |
| 3,634,276 | 1/1972 | Kreibich et al.......... | 260/38 X |

*Primary Examiner*—M. J. Welsh
*Assistant Examiner*—S. M. Person
*Attorney, Agent, or Firm*—Flynn & Frishauf

[57] ABSTRACT

Mixture of resins having repeating units of formula

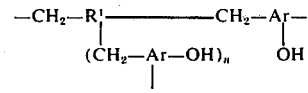

wherein $R^1$ is di or trivalent aryl, Ar is the residue of a phenol with 1–3 hydroxy groups and at least 2 nuclear carbon atoms and $n$ is 0 or 1 and 0.5 – 100% of a heat stable inorganic dispersing agent with 1 dimension less than 100 m$\mu$ and all dimensions less than 15$\mu$ can reduce cissing and blistering in cured products and can enable combinations of said mixtures with particulate materials of particle size 0.2$\mu$ – 2mm to be evenly dispersed in organic solvents. Uncured formaldehyde condensates with nitrogenous compounds containing a $N = C — NH_2$ group (or enolisable group thereof) cure the above resins.

13 Claims, No Drawings

RESIN COMPOSITIONS

The present invention relates to resin compositions and the cured products obtainable therefrom.

British Patent Specification No. 1150203 describes the production of resins having repeating units of the formula

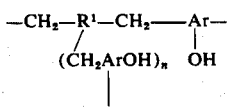

wherein $R^1$ is an aromatic hydrocarbon or aromatic hydrocarbon-oxy-aromatic hydrocarbon group, which optionally has inert substituents and Ar is the residue of a phenolic compound hereinafter defined and $n$ is 0 or 1. British Patent Specification No. 1305551 describes the curing of these resins with epoxides having 2 or more epoxy groups per molecule to form cured products.

The above resins can be used for the production of surface coatings and laminates having good chemical and high temperature ageing resistance and electrical properties.

The coatings are prepared by dissolving the resin and a suitable curing agent e.g. hexamethylene tetramine as in British Patent 1150203 or the epoxides as in British Patent 1305551 in an organic solvent e.g. 2 - ethoxy ethanol or methyl isobutyl ketone, applying the solution to the surface to be coated, evaporating the solvent and then curing the resultant coating to an infusible product. If the coating is to be used at a high temperature or if particular properties are required of it, post curing e.g. at 160° - 250°C may also be needed. We have found that the above resins tend to produce cured surface coatings showing "cissing". Cissing is a well known surface coating phenomenon (see e.g. 'Paint Film Defects' Manfred Hess, published by Chapman and Hall 2nd edition 1965, p.436) and is associated with non-wetting of the surface being coated.

Normally the resin laminates are prepared via impregnation of glass cloth, or carbon fibre or asbestos cloth with a solution of the resin in an organic solvent e.g. methyl ethyl ketone. Such laminates exhibit a wide range of utility. However, for certain applications it may be desirable to incorporate additional materials in the laminate, for example poly tetrafluoroethylene or certain flame retardent materials, the latter especially for epoxy curing agents. Hitherto, it has not been found possible to produce completely satisfactory laminates from resins incorporating such additional materials.

The above resins can also be used as adhesives but the adhesive strength of the cured resin is not very high because on curing blisters are formed.

The present invention provides a resin composition which comprises a. a resin having repeating units of the formula

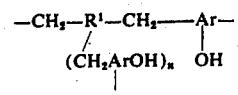

and preferably consists essentially of such repeating units, wherein $R^1$ is a divalent or trivalent aromatic hydrocarbyl or divalent or trivalent aromatic hydrocarbyl-oxy aromatic hydrocarbyl group, which optionally has at least one inert substituent and Ar is a residue formed by removal of 2 nuclear hydrogen atoms from a phenolic compound having 1-3 hydroxyl groups and at least 2 nuclear hydrogen atoms, and $n$ is 0 or 1.

b. 0.5-100% by weight (based on the weight of the resin) of an inorganic dispersing agent having at least 1 dimension less than 100 m$\mu$ and all dimensions less than 15$\mu$ and stable to at least 150°C.

The resin compositions of the invention may also contain a particulate material of particle size 0.2$\mu$ - 2mm, preferably 1$\mu$ - 1 mm, and stable to at least 150°C which is preferably at least one of a flame retardent, lubricant, metal powder, and formaldehyde condensate with a nitrogenous compound (as hereinafter described).

We have found that the composition comprising resin and as dispersing agent finely divided silica of particle size 1 - 80m$\mu$, can be used with a curing agent to prepare a coating solution, which after application, evaporation of solvent and heating/curing, produces a coated layer in which the problem of cissing is greatly reduced if not eliminated. If desired the composition may also contain the particulate material.

The compositions of the invention comprising resin, the dispersing agent and curing agent and optionally the particulate material can be cured with decreased production of blisters in the cases when volatile materials are produced on curing e.g. with hexamethylene tetramine and thus can be used as adhesives with high adhesive strength.

We have also found that the composition comprising resin, dispersing agent and particulate material can be treated with solvent to provide a dispersion, in which the particulate material is well dispersed and hence enables cured products with more uniform properties to be obtained, e.g. more even impregnation of a cloth leading to a high quality laminate.

The amount of inorganic dispersing agent is usually 0.5 - 20% (by weight based on the weight of the resin) when the resin composition is to be used for producing coatings showing reduced cissing or for adhesives showing in the cured form reduced blistering, preferred amounts being 1 - 10% in both cases. When the resin composition also contains the particulate materials, an amount of 0.5 - 100% (based on the weight of resin) of dispersing agent is used, the higher values being appropriate when the dispersion of resin, dispersing agent and particulate material is to be used as a "masterbatch" for subsequent dilution with further resin solution; amounts of dispersing agent in the region 1 - 20% are preferred when the resin dispersion is to be used as such.

The amount of particulate material in the resin composition is usually 1 - 100% (by weight of resin), the higher values again being used when the composition is to be used as a masterbatch for subsequent dilution with more resin solution. Amounts of particulate material in the range 1 - 30% are suitable for dispersions to be used as such, the preferred upper limit being dependent on the nature of the particulate material. The usual amounts of antimony oxide, chlorine and/or phosphorus containing organic flame retardants and metal powders are respectively 5%, 10% and 25%.

In the dispersions of the invention comprising resin, dispersing agents and particulate material (optionally with curing agent) the amount of dispersing agent depends on the nature and amount of the solvent and particulate material and on the degree of dispersion required.

The inorganic dispersing agent, which is stable to at least 150°C, preferably to at least 200°C, usually has a minimum dimension of at least 1mµ. It is preferably finely divided silica of average particle size 3 – 80mµ especially 7 – 40mµ, e.g. the fumed colloidal silica sold under the trade names Aerosil and Cabosil, finely divided Chrysotile asbestos e.g. of diameter about 25 mµ and length 5–10 µ such as that sold under the trade name Sylodex which optionally be mixed with silica, and finely divided hydrous magnesium aluminium silicates e.g. organic derivatives of mont-morillonite with a platelike structure of thickness 2–4mµ and maximum dimension 0.5 – 1µ, such as that sold under the trade name Bentone.

Examples of the flame retardants are organic compounds containing halogen and/or phosphorus atoms such as polyhalogenated organic compounds, preferably those in which the halogen is chlorine or bromine, and especially those in which the organic nucleus is an aromatic nucleus, e.g. decahlorobiphenyl, hexabromobenzene, hexachlorobenzene and tetrabromobisphenol A, and tris (bromopropyl) phosphate, tris (pentabromophenyl) phosphate and tris (dichloropropyl) phosphate. These compounds, which may be soluble in the resin solution, are used in conjunction with antimony oxide, which is insoluble. Other flame retardants are metal borates e.g. borates of metals of Gp. 2 (of the Periodic Table published in Bull. Soc. Chim France January 1966) such as zinc, calcium or barium. Antimony oxide may also be present in admixture with the borates.

The lubricant particulate materials may be homo polymers of tetrafluoroethylene (PTFE) and copolymers thereof with other fluorinated olefins of 3–6 carbon atoms e.g. perfluoropropylene, or may be inorganic in nature, such as graphite, molybdenum di sulphide or metal salts of fatty acids of 8–20 carbon atoms, e.g. stearic acid, zinc and calcium stearates being preferred. Incorporation of the lubricant in the resin composition enables cured products e.g. bearings having a low coefficient of friction to be obtained.

The metal powder, that may also be the particulate material, may be aluminium powder or zinc dust. Metal powders are generally used when the resin, dispersing agent and metal powder is for use in surface coating applications, but could be used for producing laminates.

The particulate material can also be a formaldehyde condensate formed from formaldehyde (or a compound yielding it in situ such a peraformaldehyde or hexamine) and a nitrogenous compound containing a

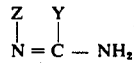

group (or a group enolisable to said group such as a

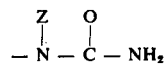

group), wherein Y represents an oxygen, sulphur or nitrogen atom, and Z represents a hydrogen, carbon or oxygen atom or Y and Z together form a direct bond. Preferably the nitrogenous compound contains at least 2 - NH₂ groups and preferably has 1–6, especially 1–3 carbon atoms. Examples of the nitrogenous compound are urea, melamine, thio urea, cyanamide, dicyandiamide and guanidine. Such condensates which may be in the cured, partially cured or uncured form are well known and are described in, for example "Aminoplastics" by C.P. Vale, published Cleaverhulme Press, London 1950. The preparation of the uncured condensates is described further below. The addition of these formaldehyde condensates to the resin compositions improves the electrical properties of the cured product.

The resin is preferably prepared as described in British patent specification No. 1150203 by reacting (1) an aralkyl ether of the general formula R'(—CH₂OR)ₐ and/or an aralkyl halide of the general formula R' 13 (CH₂X)ₐ, wherein R' is a divalent or trivalent aromatic hydrocarbyl or aromatic hydrocarbyloxy aromatic hydrocarbyl radical R' optionally containing inert substituents in the aromatic nucleus, R is an alkyl radical containing 1–5 carbon atoms, X is chlorine, bromine or iodine and a has a value of 2 or 3 with (2) a molar excess, normally of at least 1.3:1, preferably in the range of 1.4:1 to 2.5:1 of a phenolic compound or a phenolic compound and a non phenolic compound containing an aromatic nucleus. If a is 3 then n is 1 and a further ArOH group may be bonded to R' through another methylene bridge.

In these general formulae R' represents any divalent or trivalent aromatic hydrocarbyl or aromatic hydrocarbyloxy aromatic hydrocarbyl radical, for example the m - or p-phenylene radical, the diphenylene radical, the diphenylene oxide radical

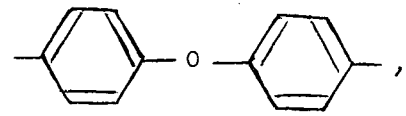

the radical

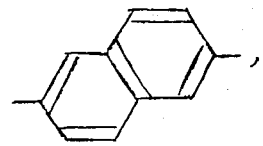

or the radical

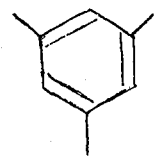

Thus both mono nuclear, and fused and unfused di-and poly nuclear radicals may be represented by R', though mononuclear radicals are preferred because the cured products therefrom have higher strength at high temperatures than those from di and polynuclear radicals. Preferably R' does not represent a diphenylene or diphenylene oxide radical when the aralkyl halide is used to prepare the resin. The resin is preferably prepared from the aralkyl ether, especially ones in which R is an alkyl radical of less than 4 carbon atoms e.g. a methyl radical. The preferred compounds for a reaction with the phenolic compounds are those in which a has a value 2, particularly the p-xylylene dihalides for example p-xylylene dichloride and the p-xylylene dialkyl ethers for example p-xylylene - glycoldimethylether. If desired, the R' radical may contain substituents, for example methyl radicals, attached to the aromatic nucleus, provided the said substituents are inert under the conditions of the reaction. In fact the presence of chlorine or fluorine atoms in some or all of the available positions in the aromatic nucleus has been found advantageous in that it leads to improved flame resistance in the resulting polymeric products. Examples of such substituted aralkyl ethers and aralkyl halides, which may be employed according to this invention, are 2,3,5,6-tetrachloro - 1,4 -di(chloromethyl) benzene and 2,3,5,6-tetrachloro - 1,4 - di (cj;prp,etju;) benzene and 2,3,5,6-tetrachloro - 1,4 - di(methoxy-methyl - benzene.

The phenolic compound includes any compound or mixture of compounds derived from benzene and containing to 1 to 3, preferably 1 or 2, hydroxyl radicals joined to the aromatic nucleus, there being a total of not more than 3 substituents attached to ring carbon atoms of the benzene nucleus apart from the one essential hydroxyl group. Thus the phenolic compounds may be of formula

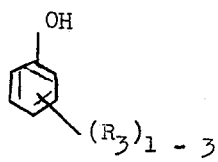

where each $R_3$ is hydrogen, hydroxyl, amino, alkyl of 1 to 8 carbon atoms, e.g. methyl, ethyl, isopropyl, tert, butyl or tert. octyl, phenyl and hydroxyphenyl alkyl e.g. hydroxy phenyl - methylene, - ethylene and - isopropylidene. Examples of these phenolic compounds are phenol, p - cresol, m - cresol, resorcinol, catechol, 4-methylcatechol, isopropyl catechol, diphenylol propane (bis 2,2-(4-hydroxy phenyl) propane), diphenylolethane, monoalkyl phenols such as p-ethylphenol, p-tert. butyl phenol and p-tert. octyl phenol, m - and p - phenyl phenol p - amino phenol, pyrogallol and phloroglucinol. Mixtures of the phenols can be used such as a monophenol with a dihydric phenol e.g. resorcinol with phenol itself, or mixtures of diphenols e.g. 4-methyl catechol and catechol and/or resorcinol such as that sold as a phenolic coal tar fraction.

Examples of the compound containing aromatic nuclei which may be mixed with the phenolic compound in the formation of the resin are diphenyl - or dibenzyl - ether, terphenyl, diphenylamine, diphenyl sulphide diphenyl, anthracene, diphenylsulphone, triphenyl phosphate, octaphenylcyclotetrasiloxane, aryl substituted borazoles and metal complexes such as ferrocene. The proportion of aromatic compound can vary within wide limits but is not sufficient to prevent satisfactory curing of the reaction product with the hardening agent. Further details of the aromatic compound and its mode of use in the reaction of phenol and dihalide or diether are given in British Patent Specification No. 1150203.

When the compositions of the invention are ready to be cured, they contain a curing agent, which may be hexamethylene tetramine, quinone, anhydroformaldehyde aniline, chloranil and ethylene diamine formaldehyde; hexamethylene tetramine is especially preferred. Such curing agents are usually present in an amount of 5 – 20%, preferably 8 – 20% and especially 10 – 15% based on the weight of the resin.

The curing agent may also be an epoxide with two or more epoxy groups per molecule. The amount of epoxide used depends on the phenolic hydroxyl group content of the resin, the epoxy group content of the epoxide and the degree of cure required. In general the epoxide is used in an amount of 25 – 150% by weight based on the weight of the resin. The epoxide is mixed with the resin and cured with or without a cure accelerator. Alternatively, the epoxide and resin can be partially reacted first and then the partially cured product cured by further heating, addition of more epoxide or some cure accelerator.

The epoxides may be glycidyl compounds such as glycidyl ethers, esters or amines, cycloaliphatic epoxides with at least one and preferably at least two epoxy groups, each fused to a cycloaliphatic nucleus other epoxy group or groups (if present) being acyclic epoxides which are not part of a gylcidyl group, or acyclic epoxides formed for example by epoxidation of acyclic diolefins. Examples of glycidyl ethers are those formed by reaction of epichlorohydrin and diphenols such as bisphenol A, or glycerol, i.e. 1,2,3- tri (1,2-epoxy propoxy) propane, epoxy novolac resins and epoxy resins such as are described in British Patent No. 1169045. Examples of glycidyl esters are those formed from aliphatic dicarboxylic acids preferably alkane dicarboxylic acids, especially linear ones of carbon atoms. Examples of glycidyl amines are the amino analogues of the glycidyl ethers e.g. from di amines such as 2,2 - bis (4-aminophenyl) propane.

The cycloaliphatic epoxides preferably have a maximum of 4 carbon atoms joining the cycloaliphatic nuclei, of more than 1 such nucleus is present, but advantageously the epoxide only contains cyclic groups between the epoxy groups. Examples of cycloaliphatic epoxides are dicyclopentadiene dioxide, vinyl cyclohex-2-ene dioxide and those of formula

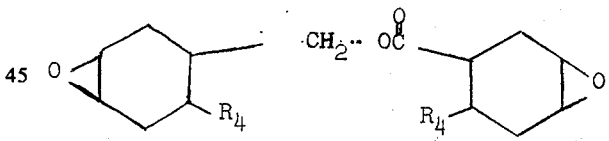

wherein $R_4$ is hydrogen or methyl, and

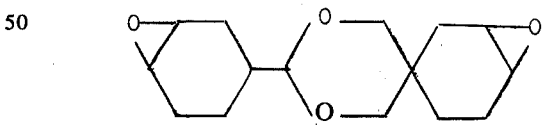

The acyclic epoxides are preferably formed from di- or tri olefins of 4–10 carbon atoms e.g. 1,2,3,4 - diepoxy butene.

The cure accelerator, which is advantageously used with the epoxides, is preferably a tertiary amine or salt thereof e.g. morpholinium p- toluenesulphonate, 2,4,6 - tris (dimethylaminomethyl) phenol or benzyl dimethylamine, or a compound having a tertiary nitrogen atom and a secondary or tertiary nitrogen atom both in a heterocyclic ring e.g. imidazoles such as N-butylimidazole. The latter class of accelerators are described in our West German OLS P2247917, while the use of epoxides for curing the resins and details of the other cure accelerators are described in our British Patent 130551.

The curing agent may also be a formaldehyde condensate with a nitrogenous compound as described above as a possible particulate material, but only in the uncured or partly cured form. The condensates are preferably made by reaction of one molar proportion of the nitrogenous compound with 1–10 molar proportions of formaldehyde (or formaldehyde yielding compound), especially 1:2 to 1:8 molar proportions, in neutral or alkaline conditions. The amount of curing agent needed for reaction with the resin in general depends on the nature of the curing agent, in particular on the number of free methylol groups on it and also the degree of curing desired. Thus for the condensates with nitrogenous compounds, less hexamethylol-melamine will generally be needed than trimethylolmelamine for equivalent curing. Normally the resin is mixed with the formaldehyde condensate in a weight ratio of 1 – 99 : 99 – 1, preferably 50 – 95 : 50 – 5 and especially 65 – 85 : 35 – 15.

The formaldehyde condensate in its uncured or partially cured forms can be used as a curing agent whether or not an inorganic dispersing agent is also present and this use constitutes a further aspect of the present invention. When the composition comprising resin (a) and condensate as curing agent is to be used as a moulding powder, the components can be dry mixed, formed into a moulding powder and subsequently moulded under heat and pressure to form cured moulded articles. When the composition comprising resin (a) and condensate as curing agent is to be used for coating purposes or for impregnation in the production of laminates, it is preferred, but not essential, to incorporate the inorganic dispersing agent as well as that the liquid dispersion used for coating or dispersion may be as uniform as possible. The conditions for curing are the same as for hexamine curing. The use of the condensates of the nitrogenous compounds as curing agents enables cured products with good electrical properties especially high arc and tracking resistance, and high heat resistance to be obtained.

The compositions of this invention may also contain inorganic fillers, e.g. asbestos flour, mica or chopped glass strands. The inorganic filler and resin will normally be present in a weight ratio of 0.05 : 1 to 4.0 : 1. Other ingredients such as pigments, accelerators, and antistaining agents e.g. magnesium oxide, or titanium dioxide may also be present if desired.

The compositions of the invention can be made by mixing the various components in any order, but it is convenient to add the curing agent last. The mixing can be carried out in any convenient method such as dry blending to form a powder for moulding (optionally with subsequent addition of organic solvent to make the desired liquid for coating and impregnating purposes) or blending in solutions in an organic solvent to prepare the liquid directly. The solvent may be a dialkyl ketone of 3-8 carbon atoms e.g. methyl isobutyl ketone, methyl ethyl ketone, or methylisoamyl ketone, isophorone, diacetone alcohol, a cycloalkyl ketone of 5-7 carbon atoms e.g. cyclohexanone, an alkoxy alkanol with 1–6 carbon atoms in the alkoxy group and 2–7 carbon atoms in the alkanol group such as 2 - ethoxyethanol, alkyl ethers thereof with 1–6 carbon atoms in the alkyl group e.g. the methyl ether, esters of the alkoxy alkanols with alkanoic acids of 2–6 carbon atoms e.g. the acetate, any of which solvents can be (in an amount sufficient to maintain the resin in solution) mixed with an aromatic hydrocarbon preferably a monocyclic one of 6–12 carbon atoms such as benzene, toluene or xylene or an aliphatic hydrocarbon such as white spirit or solvent naphtha or an alkanol e.g. of 1 to 6 carbon atoms, such as methanol, ethanol or n - butanol. The resin is usually present in the organic solvent solutions in an amount of 5 – 90% preferably 20 – 65% e.g. 20 – 50% by weight. The mixing can be carried out at a low temperature e.g. 20°– 30°C and the mixture stored until required, but the mixing of the curing agent with the remainder of the components is usually carried out at a higher temperature e.g. about 60°C for several hours e.g. 1 – 4 hrs. and then the mixture cooled to room temperature and stored until required.

The liquid dispersed mixture of resin, dispersing agent (if present), particulate material (if present), solvent and curing agent (and other additives if present) can be used as a coating solution or as an impregnant for the production of laminates. The solvent from the liquid dispersed mixture can also be evaporated and the residual product used as a moulding powder; this technique is preferred for the production of moulding powders containing long fibres, which may be broken in the dry mixing method.

The compositions of the invention are cured by heating usually at above 70°C and preferably over 100°C e.g. 150°– 175°C. Post curing if needed is usually carried out at 160°– 250°C. The time needed for post-curing varies according to the properties of the desired product, and the temperature of use of that product.

For the use of the compositions of the invention for coating, the mixture of resin, dispersing agent (if present), curing agent and solvent (together with any other additives) can be applied by any means to the surface to be coated e.g. by painting, spraying or immersion. Normally the surface will be of metal e.g. ferrous metal such as mild steel but other substrates such as wood, plastic material or inorganic materials such as porcelain or cement can be coated, if desired. After coating the solvent is evaporated and the layer cured. When the dispersing agent is finely divided silica, the cured layer shows little or no "cissing".

In the use of the compositions of the invention as adhesives the mixture of resin, dispersing agent, curing agent and solvent, (together with any other additives) can be applied to one or both of the surfaces to be adhered together by any means e.g. painting, spraying or immersion. Examples of suitable surfaces are those of metals e.g. ferrous metal such as mild steel but other substrates such as plastics materials e.g. those described in British Patent 1150203, optionally with reinforcement e.g. glass or asbestos fibres, or inorganic materials such as porcelain or cement can be used. After the applications, the solvent is evaporated, the surfaces brought together and the combination of surfaces and intervening layer cured. Because of the reduction in the number and/or size of blisters produced, the bond formed by the combination has high strength.

In the use of the compositions of the invention for making laminates, the liquid mixture is applied to the laminate base. Suitable laminate bases are glass cloth or carbon fibre agglomerates although other fibrous materials such as asbestos cloth may also be employed if desired. Such materials are impregnated with the dispersed mixture as described above and then dried. Typically the fibrous base is passed through a bath of the resin dispersion.

The fibrous material into which the resin has been impregnated is then subjected to a precure heat treatment at about 140°c, often for about 10 minutes. The laminates are then pressed at a temperature above 160°C often in the range 170° to 190°C at a pressure of from 7 to 105 kg/cm², although pressures above 35 kg/cm², often of about 70 kg/cm² are normally employed. Normally pressing will be carried out for a period of at least ½ hour, often for about an hour, depending upon the conditions of temperature and pressure employed.

For optimum results the laminates are subsequently post cured. The temperature and time employed for the post cure operations are dependent upon each other. For example a post cure in the temperature range 140°– 190°C may take up to 7 hours whereas one in the range 220°– 250°C may be accomplished in five hours. However, it is normally desirable that the material is heated to a temperature at least in the range 190°–220°C.

The invention is illustrated in the following Examples:

EXAMPLE 1

The following formulations were made up:

FORMULATION A

| | |
|---|---|
| Resin from p - xylylene glycol dimethylether and phenol (softening point temp. 102°) (Prepared as described in British Pat. No. 1150203) | 100 parts by weight |
| 2 - Ethoxyethanol | 150 parts by weight |
| Hexamethylene tetramine | 12.5 parts by weight |

FORMULATION B

As Formulation A but with 2 parts by weight fumed silica (sold under the trade name CabOsil).

The formulations were coated onto a degreased mild steel plate and allowed to dry at room temperature for 10 min. The layer produced was then cured in an oven at 250°C for 1 hr. In the case of the layer from Formulation A, cissing was apparent in the cured film on the plate, but cissing was absent in the cured film from Formulation B.

EXAMPLE 2

A surface coating composition was made up as follows:

| | |
|---|---|
| Resin (as in Example 1) | 60 pts. by wt. |
| Hexamethylene tetramine | 7 pts. by wt. |
| Aluminium lining powder | 25 pts. by wt. |
| Methyl ethyl ketone | 140 pts. by wt. |
| Fumed silica (CabOSil) | 5 pts. by wt. |

This composition was brushed onto a mild steel plate, allowed to air dry and was then cured by heating for 10 minutes at 150°C and then 10 minutes at 250°C. The resultant plate was then aged at 250°C in air for 3000 hrs. without a significant deterioration in the surface appearance.

EXAMPLE 3

The following formulation was used to impregnate Marglass 116T/P705 glass cloth:

| | |
|---|---|
| Resin from technical p-xylene glycol dimethyl ether and phenol (prepared as described in British Pat. No. 1150203) | 533 pts. by weight |
| Methyl ethyl ketone | 600 pts. by weight |
| Hexamethylene tetramine | 67 pts. by weight |
| Antimony oxide | 18 pts. by weight |
| Decachlorbiphenyl | 30 pts. by weight |
| Organic derivative of Hydrous magnesium aluminium silicate (sold under the trade name Bentone 27) | 20 pts. by weight |

These were mixed together using a Silverson mixer.

The impregnated glasscloth was precured for 10 minutes at 140°C and had a resin content of approx. 34%. Laminates were prepared by pressing at 175°C and 70 kg/cm² for an hour. These were subsequently post-cured to 250°C successfully in an oven.

Flame retardancy tests were carried out in accordance with BS 2782 method 508A, on both laminate derived from the resin alone and the above laminate based on resin and the flame retardant material. Both laminates were self-extinguishing but whereas the average self-extinguishing time for the laminate from resin alone was 2.5 seconds, the other board self-extinguished immediately the flame was removed.

EXAMPLE 4

The following formulation after thorough mixing with a high speed stirrer was used to impregnate some woven asbestos cloth (Turner Bros. Asbestos grade K103)

| | |
|---|---|
| Resin as in Ex. 3 | 267 pts. by weight |
| Methyl ethyl ketone | 300 pts. by weight |
| PTFE Powder (ICI Fluon L169B) | 15 pts. by weight |
| Fumed silica (CabOsil M5) | 12 pts. by weight |
| Hexamethylene tetramine | 33 pts. by weight |

The impregnated asbestos cloth was precured for 10 minutes at 136°C and had a resin content of approximately 44%. Laminates were made by pressing at 175°C and 70 kg/cm² for an hour and these were subsequently post-cured to 250°C in an oven. The resultant material is useful for the preparation of bearings where a low coefficient of friction and a low wear rate are required. Attempts to repeat the experiment without the fumed silica failed because the PTFE powder just floated on the top of the resin solution and this resulted in a very uneven pick-up. In some parts of the impregnated cloth there was a vast excess pf PTFE and in others none at all.

EXAMPLE 5

Example 3 was repeated using the following formulation:

| | |
|---|---|
| Resin as in Ex. 3 | 53 pts. by weight |
| Zinc borate | 10 pts. by weight |
| Methyl ethyl ketone | 70 pts. by weight |
| Fumed silica | 4 pts. by weight |
| Hexamethylene tetramine | 7 pts. by weight |

The resultant glasscloth laminate was tested in accordance with BS 2782 method 508A and self-extinguished immediately the flame was removed. Without the fumed silica the zinc borate tended to separate in the resin solution leading to less even flame retardant distribution.

EXAMPLE 6

Example 3 was repeated using a mixture of chrystotile asbestos and silica sold under the trade name Sylodex 37 in place of the hydrous magnesium aluminium silicate. Similar results were obtained.

EXAMPLE 7

Two solutions were made up as follows:

SOLUTION 1 (Comparative)

| | |
|---|---|
| Solid resin (as in Ex. 3) | 53.5 gms |
| Hexamethylene tetramine | 6.5 gms |
| Methyl ethyl ketone | 40 gms |

SOLUTION 2

As Solution 1 with 5 g of fumed silica (CabOsil) One gram of each solution was poured into separate aluminium trays (approx 6 cms in diameter). Most of the solvent was allowed to evaporate at room temperature and then the samples were cured in an oven at 200°C. The sample prepared from Solution 1 had extensive large blistering but that prepared from Solution 2 not only had less blistering but the blisters were also much smaller.

EXAMPLES 8 and 9

The method of Example 7 was repeated replacing the fumed silica by 5g of the organic derivative of montomorillonite sold under the trade name Bentone 27 and by 5g of the mixture of chrysotile asbestos and silica sold under the trade name Sylodex 24. Similar results to those obtained from Solution 2 were obtained.

The reduction in size and number of blisters formed on curing the resin containing the dispersing agent suggests that the resin mixture is suitable for use as an adhesive with good adhesive strength.

EXAMPLE 10

Resin A

An aralkylene phenol resin was made by reacting 705g (7.5 moles) of phenol and 830g (5 moles) of p-xylylene dimethyl ether (technical grade) in the presence of 1ml. of diethyl sulphate as catalyst. On heating to 130°– 200°C methanol was liberated and distilled out. The product on cooling, was a red brown solid having a softening point of 97°C.

Resin B 126g (1 mole) of melamine and 225mls (3moles) of a 40% formalin solution were mixed together and a few drops of dilute sodium hydroxide were added to make the mixture slightly alkaline. The resultant solution was heated to 75°C with stirring and on cooling a white precipitate was formed. This was filtered off and dried to obtain a white powder, trimethylol melamine nominally.

REsin C 7.5gms of resin A were mixed thoroughly in a powdered state with 2.5gms of resin B. The mixture was put into an aluminium dish and placed in an oven at 200°C. A hard infusible, insoluble mass was formed.

240 gms of resin A were dissolved in a mixture of 240 gms of ethyl methyl ketone and 80g of industrial methylated spirits. To this solution was added 80gms of resin B and 6gms of fumed silica and these were dispersed using a high speed mixer. The resultant mixture was used to impregnate glasscloth (Marglass 116T/P705) and the pre-preg produced was precured for 10 minutes at 135°C. This was cut into 25 cm × 25 cm squares and pressed into a laminate at 175°C/70 kg/cm² for 1 hour. The laminate produced was post-cured from 140° to 250°C over 23 hours and had the following flexural strengths.

| Flexural measured strength at | 20°C | 5700 kg/cm² |
|---|---|---|
| | 150°C | 2680 kg/cm² |
| | 200°C | 1300 kg/cm² |
| | 250°C | 1016 kg/cm² |

EXAMPLE 11

An aralkylene phenol resin was prepared by reacting 3000 grams (27.3 moles) of resorcinal and 3000 grams (18.1 moles) of technical p-xylylene dimethyl ether together in the presence of 15 mls. of diethyl sulphate catalyst. They were heated from 120°– 150°C over 2½ hours and all volatiles were removed. The resin formed was then poured into an aluminium tray and allowed to cool. It was a drak brown brittle solid having a softening point of 93°C.

Mixture A was made from the following ingredients:

| | |
|---|---|
| The above Resin | 179 parts by weight |
| Epoxide sold under the Trade Name Araldite CY175 | 334 parts by weight |
| 2-ethyl-4-methyl imidazole | 8.7 parts by weight |
| Methyl ethyl ketone | 342 parts by weight |

Mixture B was prepared from the following ingredients using a high speed mixer.

| | |
|---|---|
| The above Resin | 179 parts by weight |
| Epoxide (Araldite CY175 | 334 parts by weight |
| 2-ethyl-4-methyl imidazole | 8.7 parts by weight |
| Methyl ethyl ketone | 342 parts by weight |
| Antimony oxide | 5 parts by weight |
| Decachlorbiphenyl | 8 parts by weight |
| Fused silica (Cab-O-Sil) | 3 parts by weight |

The epoxide Araldite CY175 has the formula:

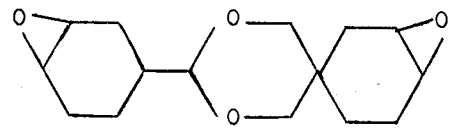

Mixtures A and B were separately used to impregnate Marglass 116T glasscloth. The impregnated cloth was precured for 10 minutes at 150°C and the resultant pre-pregs were formed into laminates by pressing for an hour at 175°C and 35 kg/cm².

The laminates were postcured for 5 hours at 200°C and then tested in accordance with the American Underwriters Laboratory Test Specification UL94 with the following results:

Laminate from mixture A: Classification SB (Slow burning)

Laminate from mixture B: Classification SE1 (Self-extinguishing)

Without the fumed silica in mixture B, the antimony oxide was incompletely dispersed and the glasscloth was not impregnated uniformly with antimony oxide giving rise to a laminate with very uneven flame resistance.

We claim:

1. A resin composition which comprises (a) a resin having repeating units of the formula

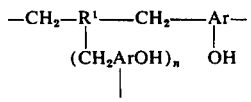

Wherein $R^1$ is a divalent or trivalent aromatic hydrocarbyl or divalent or trivalent aromatic hydrocarbyloxy-aromatic hydrocarbyl, or inertly substituted derivatives thereof, and Ar is a residue formed by removal of 2 nuclear hydrogen atoms from a phenolic compound having a 1-3 hydroxyl groups and at least 2 nuclear hydrogen atoms and n is 0 to 1, and (b) 0.5-100% by weight (based on the weight of the resin) of an inorganic dispersing agent having at least 1 dimension less than 100 m$\mu$ and all dimensions less than 15$\mu$ and stable to at least 150°C; said inorganic dispersing agent being selected from the group consisting of i. silica of particle size 3-80 m$\mu$, ii. asbestos of diameter about 25 m$\mu$ and length 5-10 $\mu$, iii. a mixture of asbestos of diameter about 25 m$\mu$ and length 5-10 $\mu$ and fumed silica; and iv. hydrous aluminum silicate of plate-like structure of thickness 2-4 m$\mu$ and a maximum dimension of 0.5-1 $\mu$; and which does not contain a particulate material of particular size 0.2 $\mu$ - 20 mm.

2. A composition according to claim 1, which comprises 0.5 - 20% by weight (based on the weight of the resin) of the inorganic dispersing agent.

3. A composition according to claim 1 wherein the dispersing agent is silica of particle size 3 - 80 m$\mu$.

4. A composition according to claim 1 which comprises the resin dissolved in an organic solvent.

5. A composition according to claim 4 wherein the solvent is selected from the group consisting of an alkoxy alkanol with 1-6 carbon atoms in the alkoxy group and 2-7 carbon atoms in the alkanol part, and a dialkyl ketone of 3-8 carbon atoms.

6. A composition according to claim 1 wherein the resin has been prepared by reacting an aralkyl di ether or dihalide of formula $R^1 (CH_2OR)_a$ or $R^1 (CH_2X)_a$ wherein R is an alkyl group of 1-5 carbon atoms, X is chlorine or bromine and a is 2 or 3, with a molar excess of a phenolic compound as defined in claim 1 or a mixture of said phenol with non phenolic aromatic compound.

7. A composition according to claim 6 wherein the resin is prepared by reacting the diether with the phenolic compound.

8. A composition according to claim 7 wherein $R^1$ is selected from the group consisting of phenylene and phenylene substituted by at least one of methyl and halogen substituents.

9. A composition according to claim 8 wherein the aralkyldiether is p-xylylene glycol dimethyl ether.

10. A composition according to claim 1 which comprises 5 - 20% by weight (based on the weight of the resin) of hexamethylene tetramine.

11. A composition according to claim 1 which comprises an epoxide having at least 2 epoxy groups per molecule.

12. A composition according to claim 1 wherein the epoxide is cycloaliphatic with at least one epoxy group fused to a cycloaliphatic nucleus.

13. A product obtained by curing a composition as claimed in claim 1.

* * * * *

UNITED STATES PATENT OFFICE
CERTIFICATE OF CORRECTION

Patent No. 3,923,721      Dated December 2, 1975

Inventor(s) ALFRED GERALD EDWARDS ET AL

It is certified that error appears in the above-identified patent and that said Letters Patent are hereby corrected as shown below:

Column 4, line 14, replace "13" with -- — --.

Column 5, line 15, delete all of the subject matter on this line; line 20, delete "to", first occurrence.

Column 7, line 1, replace "130551" with --1305551--.

Column 13: line 19, delete "a";

line 35 (last line of claim 1), replace "20" with --2--.

Signed and Sealed this

Eighteenth Day of January 1977

[SEAL]

Attest:

RUTH C. MASON  
*Attesting Officer*

C. MARSHALL DANN  
*Commissioner of Patents and Trademarks*